(12) United States Patent
Kempf et al.

(10) Patent No.: US 8,137,229 B2
(45) Date of Patent: Mar. 20, 2012

(54) MODULAR TRANSMISSION ASSEMBLY AND A METHOD OF ASSEMBLY

(75) Inventors: Gregory W. Kempf, Avon, IN (US); Kenneth D. Schoch, Greenwood, IN (US); Fredrick R. Poskie, Plymouth, MI (US); Douglas S. Burchett, Indianapolis, IN (US); Frederick W. Rhoads, Holly, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 570 days.

(21) Appl. No.: 12/274,380

(22) Filed: Nov. 20, 2008

(65) Prior Publication Data

US 2010/0125016 A1    May 20, 2010

(51) Int. Cl.
*F16H 3/72* (2006.01)
*F16H 37/06* (2006.01)
*F16H 48/06* (2006.01)

(52) U.S. Cl. ............................................. 475/149; 475/5
(58) Field of Classification Search .............. 475/5, 149
See application file for complete search history.

(56) References Cited

U.S. PATENT DOCUMENTS

| | | | |
|---|---|---|---|
| 7,002,267 B2 * | 2/2006 | Raszkowski et al. | 310/54 |
| 7,247,112 B2 * | 7/2007 | Foster et al. | 475/5 |
| 7,284,313 B2 * | 10/2007 | Raszkowski et al. | 29/596 |
| 7,810,622 B2 * | 10/2010 | Foster et al. | 192/48.619 |
| 2005/0205380 A1 * | 9/2005 | Raszkowski | 192/106 F |

* cited by examiner

*Primary Examiner* — David D Le
*Assistant Examiner* — Michael Gonzalez
(74) *Attorney, Agent, or Firm* — Quinn Law Group, PLLC

(57) ABSTRACT

A modular transmission assembly includes a transmission housing that defines a hollow interior. The transmission housing extends along a central axis between a front end and a rear end. A rear motor module is disposed in, and is operatively connected to, the transmission housing. An inner module is disposed in, and is operatively connected to, the transmission housing. A main shaft is disposed along the central axis such that each of the rear and inner modules radially surround the main shaft. A front motor is disposed in the transmission housing and radially surrounds the main shaft. The inner module is axially disposed between the rear motor module and the front motor. An input module is connected to the front end of the transmission housing. The front motor is axially disposed between the inner module and the input module.

8 Claims, 4 Drawing Sheets

MODULAR TRANSMISSION ASSEMBLY AND A METHOD OF ASSEMBLY

TECHNICAL FIELD

The present invention relates to a modular transmission assembly and a method of assembling the modular transmission.

BACKGROUND OF THE INVENTION

A transmission assembly may include one or more motors, planetary gear arrangements, clutch assemblies, and the like that are assembled within a transmission housing. The motors may further include a rotor and a stator. These transmission assemblies are typically assembled piecemeal. This means that the rotors and stators of the motors, the planetary gear arrangements, the clutch assemblies, and all of the other components of the transmission assembly are individually inserted into the transmission housing. The fully assembled transmission assembly is then tested to ensure that the transmission assembly, including each of the motors, operates properly.

SUMMARY OF THE INVENTION

A modular transmission assembly includes a transmission housing defining a hollow interior that extends along a central axis between a front end and a rear end. A rear motor module is disposed in and is operatively connected to the transmission housing. An inner module is disposed in and is operatively connected to the transmission housing. A main shaft is disposed along the central axis such that each of the rear and inner modules radially surround the main shaft. A front stator assembly is disposed in the transmission housing and radially surrounds the main shaft. The inner module is axially disposed between the rear motor module and the front stator assembly. An input module is connected to the front end of the transmission housing. The front stator assembly is axially disposed between the inner module and the input module.

A method of assembling a modular transmission includes providing a transmission housing having at least five bolt patterns enabling modular assembly of the transmission. A rear face bolt pattern encloses a rear module of the transmission assembly with a rear cover. A rear-most interior bolt circle is used to attach a rear motor module to the transmission housing. A middle interior bolt circle is used to attach an inner module to the transmission housing. A front-most interior bolt circle, nearest a front end of the transmission housing, is used to attach a front stator assembly module to the transmission housing. A front face bolt circle is used to attach the input module to the front end of the transmission housing.

The modular assembly begins by sliding the front end of the transmission housing over the rear motor module and attaching the rear motor module to the transmission housing with bolts, inserted from a rear end of the transmission housing. A C1 clutch assembly is inserted into the rear end of the transmission housing, using both as cast and machined features in the transmission housing. A C2 clutch assembly is next inserted into the rear end of the transmission housing, also using features in the transmission housing and the rear motor module. A P3 planetary gear arrangement is next inserted into the rear end of the transmission housing and attached to the C1 and C2 clutch assemblies. The rear cover is then bolted to the rear end of the transmission housing in a bolt pattern and the transmission is turned over so the front end is exposed to the assembly operators. A connecting hub and a P2 sun gear shaft are individually inserted into the front end of the transmission housing such that the rear motor module is disposed between the connecting hub and each of the C1 and C2 clutch assemblies. A T8 thrust bearing is inserted into the front end of the transmission housing and disposed about the P2 sun gear shaft in a T8 position such that the T8 thrust bearing is disposed adjacent the connecting hub. An inner module is inserted into the front end of the transmission housing. The inner module includes a C3 clutch assembly, a C4 clutch assembly, a P2 planetary gear assembly and other miscellaneous parts such as thrust bearings, connecting hubs and retaining rings. A main shaft is inserted in the front end of the transmission housing such that the main shaft extends through each of the rear module, the inner module, the P2 sun gear shaft, the connecting hub, and the T8 thrust bearing. A front rotor hub is inserted into the front end of the transmission housing. A front motor stator assembly is inserted into the front end of the transmission housing. A front motor rotor assembly is inserted into the front end of the transmission housing such that the front motor stator assembly radially surrounds the front motor rotor assembly. A P1 planetary gear arrangement is inserted into the front end of the transmission housing such that the P1 planetary gear arrangement radially engages the front rotor hub. An input module is attached to the front end of the transmission housing.

By assembling a modular transmission assembly, the number of individual components that need to be assembled within and to the transmission housing is reduced. This may reduce the amount of time that it takes to assemble the modular transmission assembly. In addition, by assembling the transmission in individual modules, metal shavings and other types of contaminants may be prevented from entering the assembled modular transmission. Also, by making the transmission assembly modular, the modular components may be tested for proper functionality prior to assembly within or to the transmission housing. This prevents the assembled modular transmission from having to be disassembled if one of the modules is not functioning properly.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Referring now to the figures, which are exemplary embodiments and wherein like elements are numbered alike.

DESCRIPTION OF THE PREFERRED EMBODIMENTS

Figure 1:
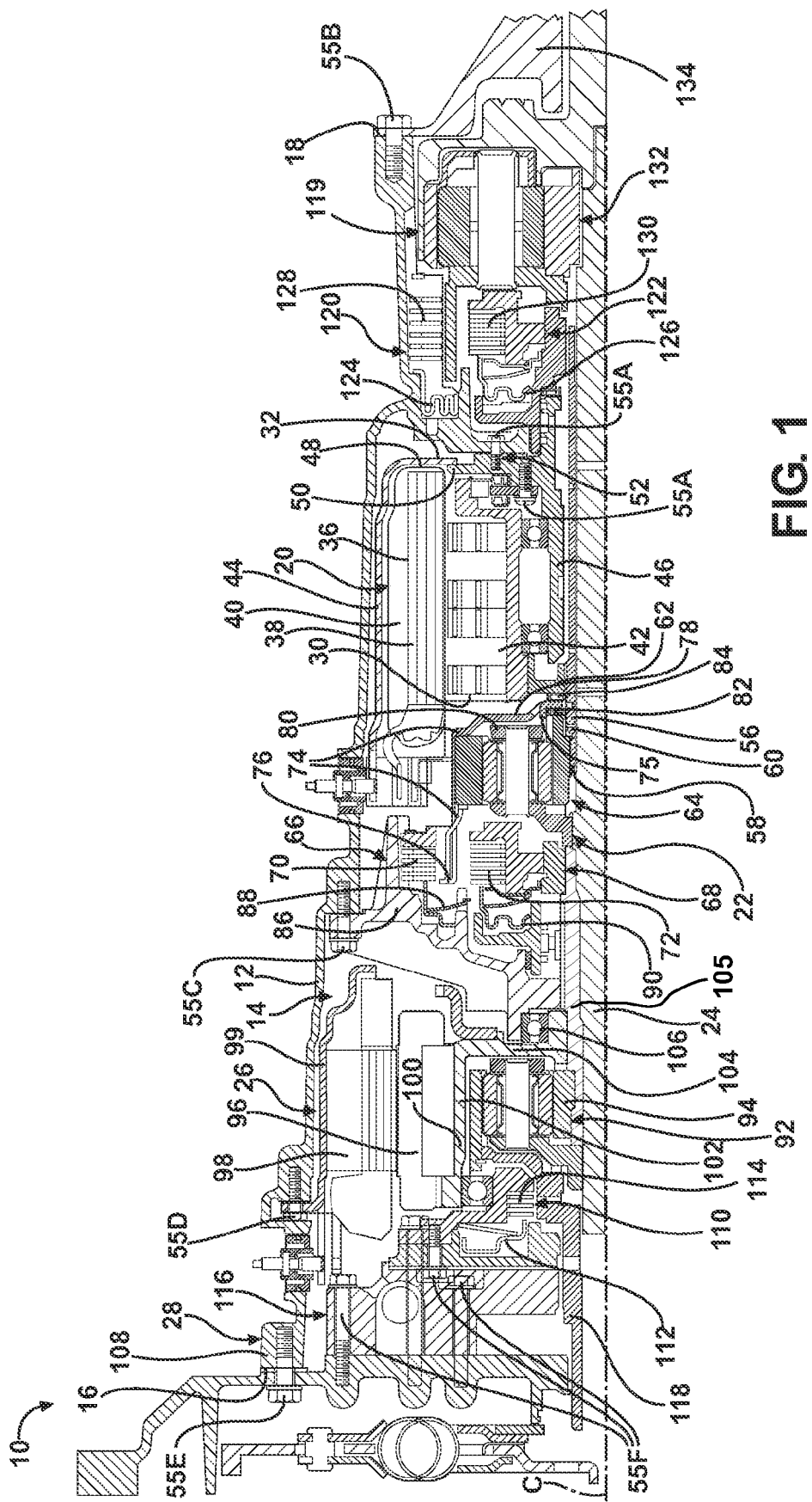
FIG. 1 is a partial cross sectional view of a modular transmission assembly having a rear motor module, a rear module, an inner module, and an input module.

Referring to the drawings, wherein like reference numbers refer to like components, FIG. 1 shows a modular transmission assembly 10 for connection to an engine (not shown) of a vehicle (not shown). The modular transmission assembly 10 includes a transmission housing 12 that defines a hollow interior 14 extending along a central axis C between a front end 16 and a rear end 18. The front end 16 of the transmission housing 12 generally corresponds to an input into the modular transmission assembly 10 from an engine (not shown). The rear end 18 of the transmission housing 12 corresponds to an output from the modular transmission assembly 10 to drive wheels (not shown) of the vehicle.

Figure 2:
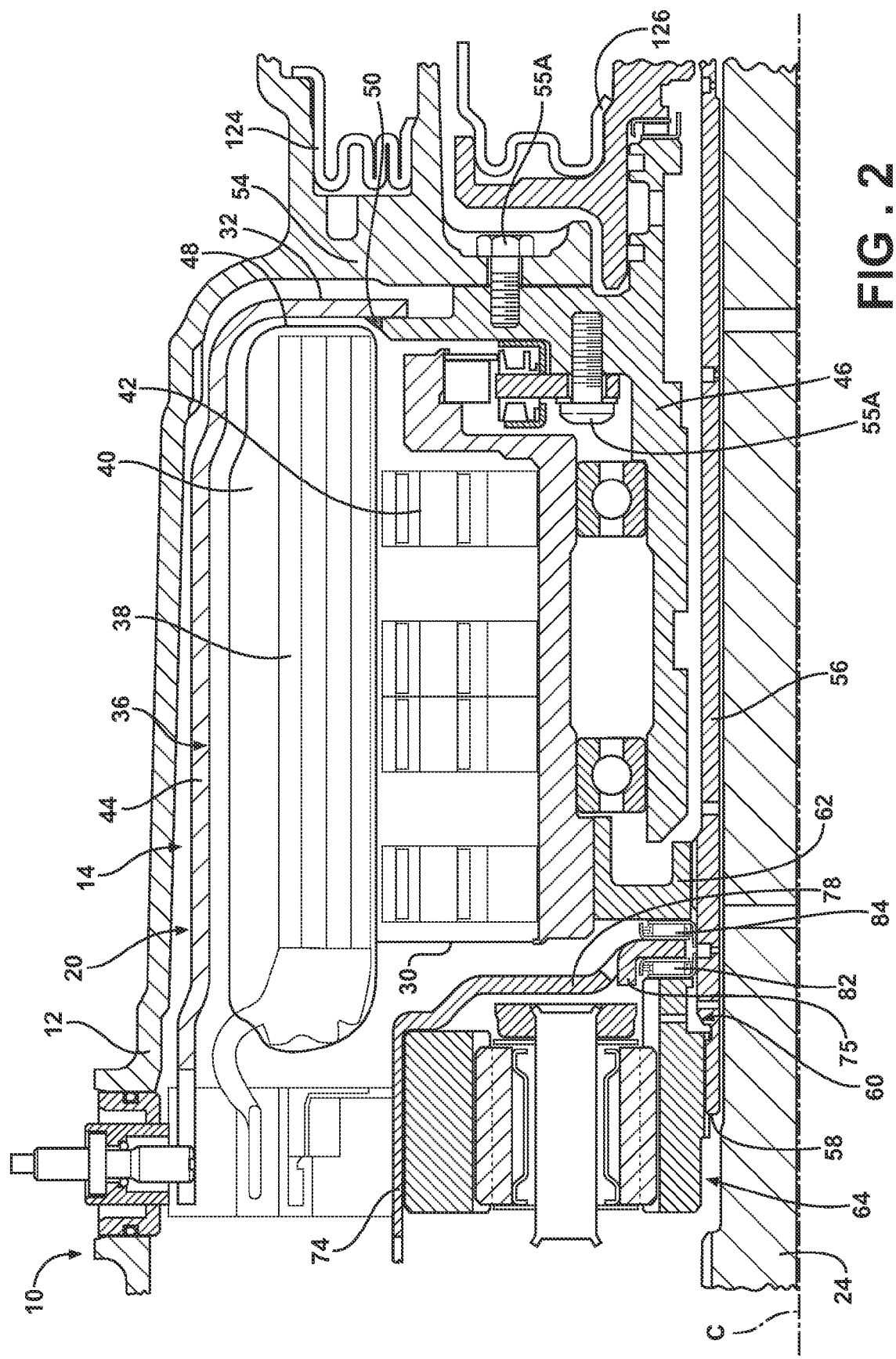
FIG. 2 is a schematic partial cross sectional view of the rear motor module of the modular transmission of FIG. 1.
Figure 3:
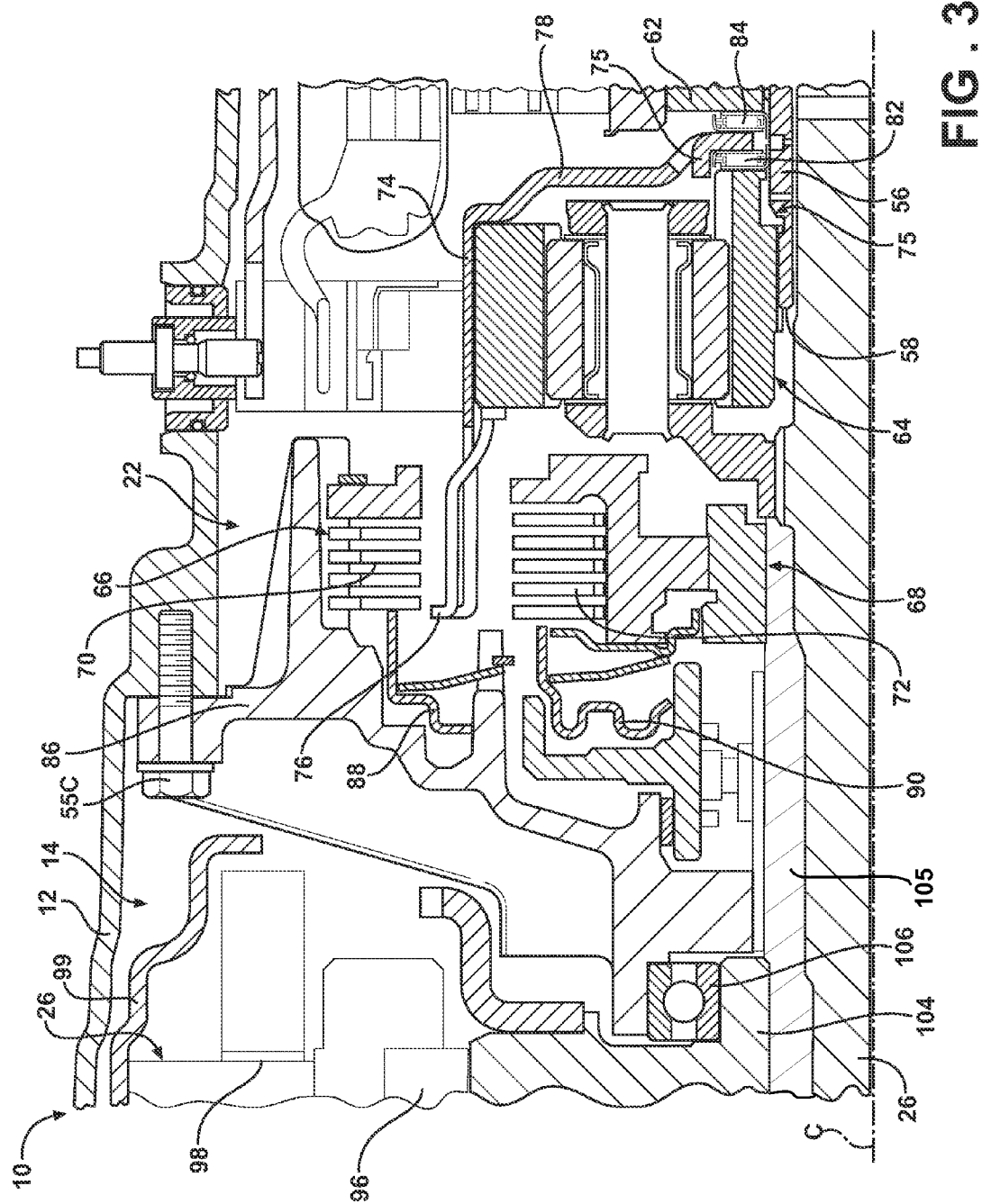
FIG. 3 is schematic partial cross sectional view of the inner module of the module transmission of FIG. 1.
Figure 4:
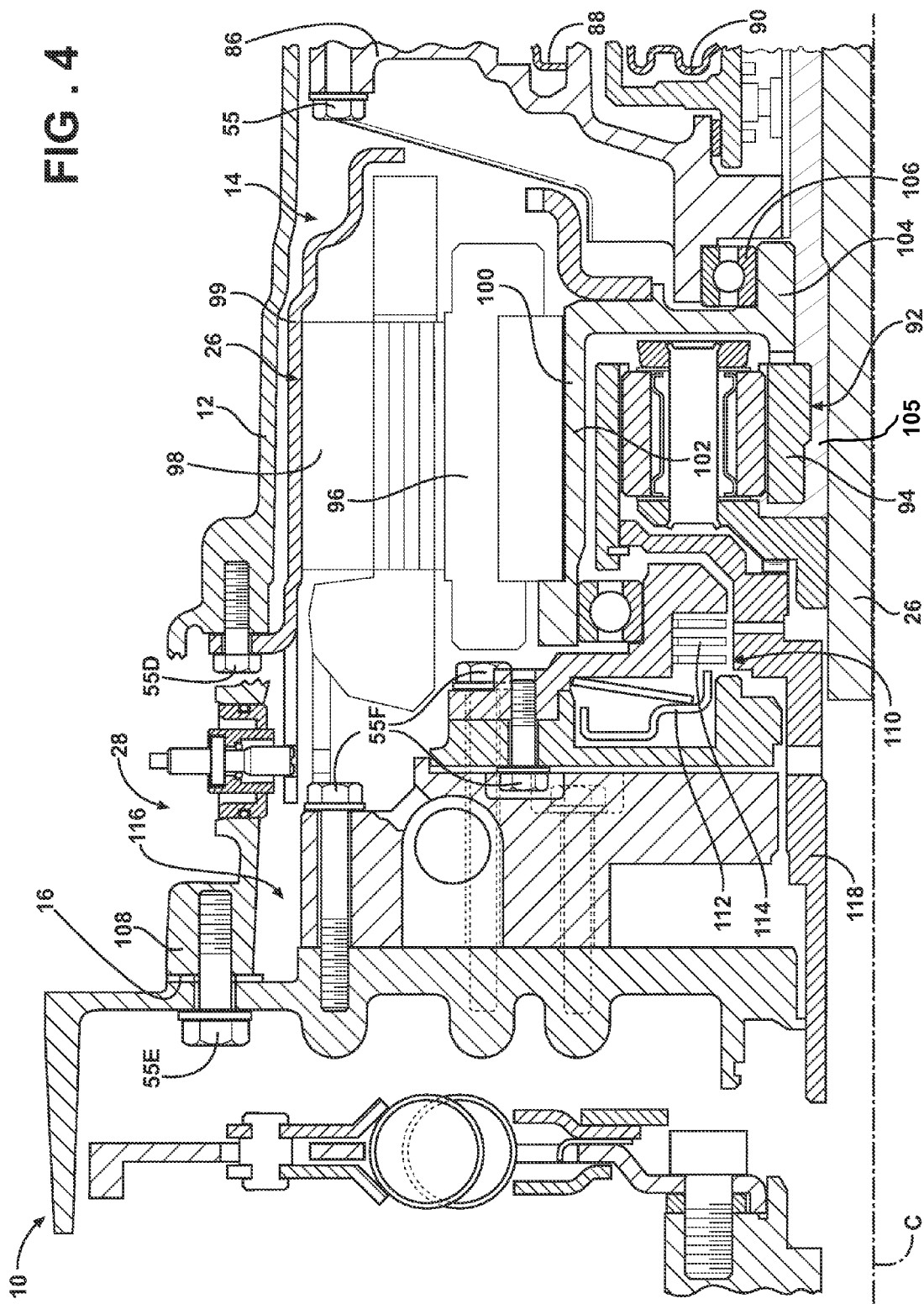
FIG. 4 is a schematic partial cross sectional view of the input module of the modular transmission of FIG. 1.

A rear motor module 20 is disposed in, and is operatively connected to, the transmission housing 12, as shown in FIGS. 1 and 2. An inner module 22 is disposed in, and is operatively connected to, the transmission housing 12, as shown in FIGS. 1 and 3. A main shaft 24 is disposed along the central axis C for rotation about the central axis C. The rear motor and inner modules 20, 22 each radially surround the main shaft 24. A front motor stator assembly 26 is disposed in the transmission housing 12. The front motor stator assembly 26 radially surrounds the main shaft 24. The inner module 22 is axially disposed along the central axis C between the rear motor module 20 and the front motor stator assembly 26. An input module 28 is connected to the front end 16 of the transmission housing 12, as shown in FIGS. 1 and 4. The front motor stator assembly 26 is axially disposed along the central axis C between the inner module 22 and the input module 28.

Referring to FIGS. 1 and 2, the rear motor module 20 extends between a first end 30 and a second end 32. The rear motor module 20 includes a rear motor 36. The rear motor 36 may be an electric motor or any other motor known to those skilled in the art. The rear motor 36 may include a plurality of permanent magnets 38. The rear motor 36 may include a rear stator 40. The rear motor 36 may also include a rear rotor 42 for rotation relative to the rear stator 40 about the central axis C. The rear stator 40 may radially surround the rear rotor 42. The rear motor module 20 may also include a rear stator housing 44 that radially surrounds the rear motor 36. More specifically, the rear stator housing 44 radially surrounds the rear stator 40 such that the rear stator 40 is operatively connected to the rear stator housing 44. A bearing support 46 radially surrounds the main shaft 24 about the central axis C. The bearing support 46 is radially surrounded by the rear motor 36. More specifically, the bearing support 46 is radially surrounded by the rear rotor 42. The rear stator housing 44 and the bearing support 46 extend axially along the central axis C and at least partially extend about an end 48 of the rear motor 36, proximate the second end 32 of the rear motor module 20. The rear stator housing 44 and the bearing support 46 come together across the end 48 of the rear motor 36 and a joint 50 is defined therebetween. The joint 50 may be formed by welding, fastening, and the like. Therefore, by joining the rear stator housing 44 and the bearing support 46, the rear stator housing 44, and the bearing support 46 provide a unitary construction to contain and support all of the components of the rear motor 36 therein. Connection of the bearing support 46 retains the rear motor module 20 within the transmission housing 12. A connection point 52 is defined in the bearing support 46 at the second end 32 of the rear motor module 20. The connection point 52 is used to connect the rear motor module 20 as a single unit to a mounting flange 54 of the transmission housing 12 via at least one fastener 55A. It should be appreciated, however, that the invention is not limited to using fasteners 55A at the connection point 52, as any other connector known to those skilled in the art may also be used. In addition, the connection point 52 may be used to mount the rear motor module 20 on a test stand (not shown) prior to assembly to the transmission housing 12 to verify the rear motor 36 disposed within the rear motor module 20 operates properly.

Referring again to FIGS. 1 and 2, a P2 sun gear shaft 56 is disposed along the central axis C and radially surrounds at least a portion of the main shaft 24. The P2 sun gear shaft 56 extends to an insertion end 58 having a tapered end 60. A connecting hub 62 having a C-shape may be disposed within the transmission housing 12. The connecting hub 62 radially surrounds the P2 sun gear shaft 56 and the main shaft 24 about the central axis C. In addition, the connecting hub 62 is splined to the P2 sun gear shaft 56 for rotation about the central axis C therewith. The connecting hub 62 is also operatively connected to the rear rotor 42 such that the rear rotor 42 is operatively connected to the P2 sun gear shaft 56 for rotation about the central axis C therewith.

Referring to FIGS. 1 and 3, the inner module 22 includes a P2 planetary gear arrangement 64 and a C3 and a C4 clutch assembly 66, 68. The P2 planetary gear arrangement 64 is splined to the main shaft 24 and the P2 sun gear shaft 56. Therefore, the P2 planetary gear arrangement 64 radially extends about the main shaft 24 and a portion of the P2 sun gear shaft 56. The C3 clutch assembly 66 has a plurality of C3 clutch plates 70. The C4 clutch assembly 68 has a plurality of C4 clutch plates 72. The C3 and the C4 clutch assemblies 66, 68 each radially extend about the central axis C. A P2 hub 74 radially extends about the central axis C to radially surround the P2 planetary gear arrangement 64. The P2 hub 74 is operatively connected to the P2 planetary gear arrangement 64. The P2 hub 74 extends axially along the central axis C, toward the front end 16 of the transmission housing 12, to a retention flange 76. The retention flange 76 radially extends away from the central axis C to axially retain each of the C3 and the C4 clutch plates 70, 72 on the P2 hub 74 during assembly of the inner module 22 to the transmission housing 12. Therefore, when the inner module 22 is tilted downward, the retention flange 76 prevents the C3 and the C4 clutch plates 70, 72 from sliding off of the P2 hub 74. A rear wall 78 of the P2 hub 74 also radially extends about an end 80 of the P2 planetary gear arrangement 64 and toward the central axis C such that the rear wall 78 generally faces the first end 30 of the rear motor module 20, as shown in FIGS. 1-3. A first thrust bearing or a T8 thrust bearing 82 is axially disposed along the central axis C between the rear wall 78 of the P2 hub 74 and the P2 sun gear shaft 56 in a T8 position. The T8 thrust bearing 82 is axially and radially retained between the rear wall 78 of the P2 hub 74 and the P2 sun gear shaft 56. The rear wall 78 of the P2 hub 74 may also include at least one tab 75 that is formed from the P2 hub 74 and may be folded over the T8 thrust bearing 82 to radially retain the T8 thrust bearing 82 relative to the central axis C. The tab 75 may be formed by stamping, flow forming, and the like. The tapered end 60 of the P2 sun gear shaft 56 helps to guide the T8 thrust bearing 82 over the P2 sun gear shaft 56 as the T8 thrust bearing 82 is slid over the P2 sun gear shaft 56 as part of the inner module 22. A second thrust bearing 84 is also disposed axially between the rear wall 78 of the P2 hub 74 and the connecting hub 62. Therefore, the rear wall 78 of the P2 hub 74 is sandwiched axially between the first and second thrust bearings 82, 84.

Referring again to FIGS. 1 and 3, the inner module 22 may also include a C3 clutch housing 86. The C3 clutch housing 86 is disposed axially along the central axis C between the inner module 22 and the front motor stator assembly 26. The C3 clutch housing 86 is operatively connected to the transmission housing 12 by fasteners 55C and the like. The C3 clutch housing 86 houses a C3 piston 88 and a C4 piston 90. The C4 clutch plates 72 and the C3 clutch plates 70 rotate about the central axis C relative to the C4 piston 90 and the C3 piston 88, respectively.

A P1 planetary gear arrangement 92 extends radially about the main shaft 24, as shown in FIGS. 1 and 4. The P1 planetary gear arrangement 92 includes a P1 sun gear 94. The front motor stator assembly 26 radially surrounds the P1 planetary gear arrangement 92. The front motor stator assembly 26 may be an electric motor or any other motor known to those skilled in the art. The front motor stator assembly 26 includes a front motor rotor assembly 96 and a front motor stator assembly 98. The front motor rotor assembly 96 radially surrounds the main shaft 24 about the central axis C. A front stator housing 99 radially surrounds the front motor stator assembly 98. The front motor stator assembly 98 is operatively connected to the front stator housing 99. The front stator housing 99 is operatively connected to the transmission housing 12 and radially surrounds the front motor rotor assembly 96 about the central axis C. The front stator housing 99 may be operatively connected to the transmission housing 12 via at least one fastener 55D and the like. A first portion 100 of a front rotor hub 102 extends in spaced and parallel relationship to the central axis C to radially surround the main shaft 24. A second portion 104 of the front rotor hub 102 extends radially toward the central axis C and engages a P1 sun gear shaft 105. The P1 sun gear shaft 105 radially surrounds the main shaft 24. The front rotor hub 102 operatively interconnects the P1 sun gear 94, via the second portion 104, the front motor rotor assembly 96, via the first portion 100, and the C4 clutch assembly 68, via the second portion 104. More specifically, a bearing 106 is disposed between the second portion 104 of the front rotor hub 102 and the C3 clutch housing 86 to allow relative rotation of the front rotor hub 102 about the central axis C, relative to the C3 clutch housing 86. The P1 planetary gear arrangement 92 is splined onto the P1 sun gear 94 for rotation in unison.

Referring again to FIGS. 1 and 4, the input module 28 includes an input housing 108, a C5 clutch assembly 110, and a C5 clutch piston 112. The C5 clutch assembly 110 includes a plurality of C5 clutch plates 114. In addition, the input module 28 may contain a pump body assembly 116 for providing lubrication to the modular transmission assembly 10. The input housing 108 is operatively connected to the front end 16 of the transmission housing 12. The input housing 108 may be operatively connected to the front end 16 of the transmission housing 12 via fasteners 55E and the like. The C5 clutch assembly 110 and the pump body assembly 116 are operatively connected to the input housing 108 such that the C5 clutch assembly 110 and the pump body assembly 116 are axially disposed along the central axis C between the input housing 108 and the front motor stator assembly 26. The C5 clutch assembly 110 and the pump body assembly may be operatively connected to the input housing 108 via fasteners 55F and the like.

An input shaft 118 extends through the front end 16 of the transmission housing 12 along the central axis C and through the input module 28, as shown in FIGS. 1 and 4. The input shaft 118 is operatively connected to the P1 planetary gear arrangement 92. The input module 28 is configured for operative connection to the output from the engine.

A rear module 119 is disposed in, and is operatively connected to, the transmission housing 12, as shown in FIG. 1. The rear module 119 is disposed between the second end 32 of the rear motor module 20 and the rear end 18 of the transmission housing 12. The rear module 119 includes a C1 and a C2 clutch assembly 120, 122. The mounting flange 54 of the transmission housing 12 houses C1 piston 124. The C1 clutch assembly 120 includes a plurality of C1 clutch plates 128 and the C2 clutch assembly 122 includes a plurality of C2 clutch plates 130 and C2 piston 126. The C1 and C2 clutch plates 128, 130 rotate about the central axis C, relative to the C1 and C2 pistons 124, 126, respectively. A P3 planetary gear arrangement 132 is disposed in the transmission housing 12 between the C1 and C2 clutch assemblies 120, 122 and the rear end 18 of the transmission housing 12. The P3 planetary gear arrangement 132 is splined to the main shaft 24 and is operatively connected to the C1 and C2 clutch assemblies 120, 122. A rear cover 134 may be placed over, and bolted to, the transmission housing 12 to retain the rear module 119 to the transmission housing 12.

To assemble the modular transmission assembly 10, the rear motor module 20 is oriented such that the second end 18 is facing generally upward, relative to the ground. The front end 16 of the transmission housing 12 may be oriented such that the front end 16 is facing generally downward, relative to the ground, and the front end 16 of the transmission housing 12 is slid over the second end 32 of the rear motor module 20. Therefore, after transmission housing 12 is slid over the rear motor module 20, the first end 30 of the rear motor module 20 faces the front end 16 of the transmission housing 12 and the second end 32 of the rear motor module 20 faces the rear end 18 of the transmission housing 12. While the front end 16 of the transmission housing 12 is facing generally downward, relative to the ground, the rear end 18 of the transmission housing 12 is facing generally upward, relative to the ground. At least one fastener 55A may then be inserted through the mounting flange 54 of the transmission housing 12 and the second end 32 of the rear motor module 20 via the rear end 18 of the transmission housing 12 to retain the rear motor module 20 to the transmission housing 12. The fasteners 55A may be attached about the transmission housing 12 to form a bolt circle or any other pattern to sufficiently secure the rear motor module 20 to the transmission housing 12. As described above the fastener 55A would extend through the bearing support 46 of the rear motor module 20. The rear motor module 20 may then be attached to the mounting flange 54 of the transmission housing 12 via one or more fasteners 55A.

The C1 clutch assembly 120 may be inserted into the rear end 18 of the transmission housing 12, proximate the second end 32 of the rear motor module 20. The C2 clutch assembly 122 may be inserted into the rear end 18 of the transmission housing 12, proximate the second end 32 of the rear motor module 20. The connecting hub 62 may then be inserted into the front end 16 of the transmission housing 12 such that the rear motor module 20 is disposed between the connecting hub 62 and each of the C1 and C2 clutch assemblies 120, 122.

The P2 sun gear shaft 56 may then be inserted into the front end 16 of the transmission housing 12. The T8 thrust bearing 82 may be inserted as part of the inner module 22 into the front end 16 of the transmission housing 12 such that the T8 thrust bearing 82 extends about the P2 sun gear shaft 56 and is axially disposed adjacent the connecting hub 62. The inner module 22 may be inserted into the front end 16 of the transmission housing 12. The inner module 22 is attached to the transmission housing 12 via fasteners 55C and the like that are inserted through the front end 16 of the transmission housing 12. The fasteners 55C may be attached about the inside of the transmission housing 12 to form a bolt circle or any other pattern to sufficiently secure the inner module 22 to the transmission housing 12. The main shaft 24 may be inserted in the front end 16 of the transmission housing 12, along the central axis C, such that the main shaft 24 extends through each of the rear motor module 20, the inner module 22, the P2 sun gear shaft 56, the connecting hub 62, and the T8 thrust bearing 82. The front rotor hub 102 is inserted into the front end 16 of the transmission housing 12, along the central axis C.

The front motor stator assembly 98 may then be inserted into the front end 16 of the transmission housing 12. The front stator housing 99 of the front motor stator assembly 98 may be attached to the transmission housing 12 via fasteners 55D and the like, arranged about the transmission housing 12 as a bolt circle or any other pattern to sufficiently secure the front motor stator assembly 98 to the transmission housing 12.

The front motor rotor assembly 96 may be inserted into the front end 16 of the transmission housing 12 such that the front motor stator assembly 98 radially surrounds the front motor rotor assembly 96. The P1 planetary gear arrangement 92 may be inserted into the front end 16 of the transmission housing 12 such that the P1 planetary gear arrangement 92 radially engages the front motor hub 102.

The C5 clutch assembly 110 may be attached to the input housing 108. The input module 28 may be inserted into the front end 16 of the transmission housing 12 and the input housing 108 may be attached to the front end 16 of the transmission housing 12. The input module 28 may then be attached to the front end of the transmission housing with fasteners 55E that extend through the input housing 108 as a bolt circle or any other pattern to sufficiently secure the input module 28 to the transmission housing 12.

The P3 planetary gear arrangement 132 may be inserted into the rear end 18 of the transmission housing 12. The P3 planetary gear arrangement 132 may be inserted into the rear end 18 of the transmission housing 12 at any time after the C1 and the C2 clutch assemblies 120, 122 are inserted into the transmission housing 12. Following insertion of the P3 planetary gear arrangement 132 into the rear end 18 of the transmission housing 12, the rear cover 134 may be placed over, and bolted to, the rear end 18 of the transmission housing 12 with a plurality of the fasteners 55B. Once the rear cover 134 is attached to the rear end 18 with fasteners 55B, the transmission assembly 10 may be turned over such that the front end 16 is exposed to assembly operators and the rear module 119 is retained within the transmission housing 12.

While the best modes for carrying out the invention have been described in detail, those familiar with the art to which this invention relates will recognize various alternative designs and embodiments for practicing the invention within the scope of the appended claims.

The invention claimed is:

1. A method of assembling a modular transmission assembly, said method comprising:
   providing a rear motor module extending between a first end and a second end, wherein the rear motor module includes a rear motor assembly;
   sliding a front end of a transmission housing over the second end of the rear motor module;
   inserting a first clutch assembly into a rear end of the transmission housing, proximate the second end of the rear motor module;
   inserting a second clutch assembly into the rear end of the transmission housing, proximate the second end of the rear motor module;
   inserting a connecting hub into the front end of the transmission housing such that the rear motor module is disposed between the connecting hub and each of the first and second clutch assemblies;
   inserting a sun gear shaft into the front end of the transmission housing;
   inserting a first thrust bearing into the front end of the transmission housing and about the P2 sun gear shaft such that the first thrust bearing is disposed adjacent the connecting hub;
   inserting an inner module into the front end of said transmission housing, wherein the inner module includes a third clutch assembly, a fourth clutch assembly, and a first planetary gear assembly;
   inserting a main shaft in the front end of the transmission housing such that the main shaft extends through each of the rear motor module, the inner module, the sun gear shaft, the connecting hub, and the first thrust bearing;
   inserting a front rotor hub into the front end of the transmission housing;
   inserting a front motor stator assembly into the front end of the transmission housing;
   inserting a front motor rotor assembly into the front end of the transmission housing such that the front motor stator assembly radially surrounds the front motor rotor assembly;
   inserting a second planetary gear arrangement into the front end of the transmission housing such that the second planetary gear arrangement radially engages the front rotor hub; and
   attaching an input module to the front end of the transmission housing.

2. A method, as set forth in claim 1, further comprising attaching the rear motor module to the transmission housing.

3. A method, as set forth in claim 1, further comprising attaching the inner module to the transmission housing.

4. A method, as set forth in claim 1, further comprising attaching the front motor stator assembly to the transmission housing.

5. A method, as set forth in claim 1, further comprising attaching a C5 clutch assembly to the input housing.

6. A method, as set forth in claim 5, further comprising inserting the fifth clutch assembly of the input module into the front end of the transmission housing such that the fifth clutch assembly is axially disposed between the second planetary gear arrangement and the input housing.

7. A method, as set forth in claim 1, further comprising inserting a third planetary gear arrangement into the rear end of the transmission housing.

8. A modular transmission assembly, said assembly comprising:
   a transmission housing defining a hollow interior extending along a central axis between a front end and a rear end;
   a rear motor module extending between a first end and a second end, wherein said rear motor module is configured for insertion of said second end into said front end of said transmission housing for connection to said transmission housing;
   a first clutch assembly configured for insertion into said second end of said transmission housing and for connection to said transmission housing, proximate said rear motor module;
   a second clutch assembly configured for insertion into said rear end of said transmission housing and for connection to said transmission housing, proximate said rear motor module;
   a connecting hub configured for insertion into said front end of said transmission housing and for axial disposition opposite each of said first and said second clutch assemblies;
   a sun gear shaft configured for insertion into said front end of said transmission housing along said central axis;
   a first thrust bearing configured for insertion into said front end of said transmission housing, over said sun gear shaft, and adjacent said connecting hub;
   an inner module configured for insertion into said front end of said transmission housing and to be connected to said transmission housing;

a main shaft configured for insertion into said transmission housing along said central axis such that each of said rear motor module, said inner module, said sun gear shaft connecting hub, and said first thrust bearing radially surround said main shaft;

a front rotor hub configured for insertion into said front end of said transmission housing;

a front motor stator assembly configured for insertion into said transmission housing and to be connected to said transmission housing;

a front motor rotor assembly configured for insertion into said front end of said transmission housing such that said front motor stator assembly radially surrounds said front motor rotor assembly;

a planetary gear arrangement configured for insertion into said front end of said transmission housing and for radially engaging said front rotor hub; and an input module configured to be connected to said front end of said transmission housing.

* * * * *